US010990762B2

(12) United States Patent
Madavarapu et al.

(10) Patent No.: US 10,990,762 B2
(45) Date of Patent: Apr. 27, 2021

(54) CHAT ANALYSIS USING MACHINE LEARNING

(71) Applicant: Verizon Patent and Licensing Inc., Arlington, VA (US)

(72) Inventors: Ravi Karan Madavarapu, Irving, TX (US); Jiandong Guo, Plano, TX (US); Shail Bhatt, Plano, TX (US); Apurva J. Sheth, Allen, TX (US); Srinivas Parimi, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 110 days.

(21) Appl. No.: 16/361,101

(22) Filed: Mar. 21, 2019

(65) Prior Publication Data

US 2020/0302017 A1 Sep. 24, 2020

(51) Int. Cl.
| | | |
|---|---|---|
| *G06F 21/00* | (2013.01) | |
| *H04L 9/32* | (2006.01) | |
| *G06F 40/30* | (2020.01) | |
| *G06N 20/20* | (2019.01) | |
| *H04L 12/58* | (2006.01) | |
| *G06F 40/289* | (2020.01) | |
| *H04L 29/06* | (2006.01) | |

(52) U.S. Cl.
CPC ............ *G06F 40/30* (2020.01); *G06F 40/289* (2020.01); *G06N 20/20* (2019.01); *H04L 51/02* (2013.01); *H04L 51/046* (2013.01); *H04L 63/1408* (2013.01); *H04L 63/1483* (2013.01)

(58) Field of Classification Search
CPC ........................... H04L 63/1483; H04L 51/12
See application file for complete search history.

(56) References Cited

U.S. PATENT DOCUMENTS

| | | | |
|---|---|---|---|
| 2003/0105822 A1* | 6/2003 | Gusler | H04L 51/04 709/206 |
| 2004/0111479 A1* | 6/2004 | Borden | H04L 12/1813 709/206 |
| 2008/0177841 A1* | 7/2008 | Sinn | H04L 51/12 709/206 |
| 2008/0276315 A1* | 11/2008 | Shuster | H04L 51/12 726/22 |
| 2013/0137401 A1* | 5/2013 | Begeja | H04W 12/12 455/411 |
| 2013/0138427 A1* | 5/2013 | de Zeeuw | G06F 40/226 704/9 |

(Continued)

*Primary Examiner* — Jialong He (57) ABSTRACT

A device may receive information associated with a set of chat logs. The device may obtain context information associated with the information, wherein the context information identifies a network address associated with a participant of the set of chat logs. The device may determine whether the set of chat logs is to be assigned to a first category, a second category, or a third category, wherein the first category is associated with fraudulent chat logs, wherein the second category is associated with chat logs involving a misrepresentation, and wherein the third category is associated with chat logs that are not identified as fraudulent or involving a misrepresentation. The device may perform an action based on whether the set of chat logs is assigned to the first category, the second category, or the third category.

20 Claims, 7 Drawing Sheets

(56) References Cited

U.S. PATENT DOCUMENTS

| | | | |
|---|---|---|---|
| 2013/0198860 A1* | 8/2013 | Guo | G06F 21/554 |
| | | | 726/28 |
| 2015/0026786 A1* | 1/2015 | Alexander | H04M 3/436 |
| | | | 726/7 |
| 2015/0237061 A1* | 8/2015 | Shraim | H04L 63/1491 |
| | | | 726/22 |
| 2017/0221111 A1* | 8/2017 | Salehi | G06Q 30/0185 |
| 2017/0270526 A1* | 9/2017 | Fitzgerald | G06N 20/00 |
| 2018/0108015 A1* | 4/2018 | Rogas | H04L 61/1511 |
| 2019/0130490 A1* | 5/2019 | Durkee | G06Q 40/08 |
| 2020/0219105 A1* | 7/2020 | Mossoba | G06Q 20/047 |

* cited by examiner

CHAT ANALYSIS USING MACHINE LEARNING

BACKGROUND

A system may provide an interface to facilitate communication between two or more parties. For example, a chat interface may facilitate textual communication. A chat interface may be useful for communication between a customer and an agent, such as a chat bot, a customer service agent, a technical support technician, and/or the like.

DETAILED DESCRIPTION OF PREFERRED EMBODIMENTS

The following detailed description of example implementations refers to the accompanying drawings. The same reference numbers in different drawings may identify the same or similar elements.

A chat interface may be used to facilitate communication between participants. In some cases, the participants may include a customer and an agent. For example, the customer may engage the agent in the interest of receiving a service (e.g., customer service, technical support, sales, etc.). A participant may engage in the chat communication with a fraudulent purpose, to perform a misrepresentation, to perform a prank, and/or the like. A fraudulent chat communication may refer to any chat communication performed with the intention of obtaining an item or service fraudulently. As used herein, a misrepresentative chat communication may refer to a chat communication performed by a participant with the goal of misrepresenting the purpose of the chat communication.

It may be challenging to detect when a chat communication is associated with a fraudulent or misrepresentative purpose. For example, while participants with dishonest intentions may be associated with certain characteristic features, it may be challenging to identify a fraudulent or misrepresentative participant based on a single chat communication or a group of chat communications, particularly when the method for identifying fraudulent or misrepresentative participants lacks a system-wide view of context information that may be helpful for classifying the participants. Still further, the techniques employed by fraudulent or misrepresentative participants may evolve over time, thereby rendering static methods ineffective for identifying and eliminating fraud, misrepresentation, pranks, and/or the like. Fraud or misrepresentation wastes computing resources because the fraud or misrepresentation must be identified, investigated, and rectified after the fact.

Some implementations described herein provide a machine learning (ML) platform that trains an ML model to detect fraudulent chat communications, misrepresentative chat communications, and/or the like. For example, the ML platform may be trained based on a training set of chat information (e.g., chat logs, transcripts, and/or the like) and context information associated with the chat information (e.g., geolocation information, browser information, device information, metadata, information regarding a participant's chat participation, and/or the like), as well as categorizations of chat communications or participants associated with the chat information.

After training the ML model, the ML platform may deploy the ML model to detect fraudulent or misrepresentative chat communications as the chat communications occur. For example, the ML platform may use the ML model to process a data stream of chat information and context information so that fraudulent or misrepresentative chat communications can be identified in real time or substantially real time. Thus, preventative measures can be taken in near real time as the chat occurs, such as blocking the chat communication, escalating the chat communication to an administrator or law enforcement, canceling an order associated with the chat communication, and/or the like. In some implementations, the ML platform may update the ML model based on a result of a determination. For example, the ML platform may update the ML model based on an indication of whether a categorization of a participant was accurate. Thus, the ML model may learn and adjust over time based on changing approaches of participants, additional types of context information, and/or the like. The ML model can be applied in real time (e.g., as chats occur) or post hoc (e.g., after chats occur). As used herein, "real time" may refer to substantially real time, having some delay, in a streaming fashion, and/or the like.

By training an ML model to identify fraudulent or misrepresentative chat communications based on the chat communications and based on context information, the ML platform may conserve resources of the chat interface that may otherwise be used to interact with malicious participants and/or provide services for the malicious participants. Furthermore, the ML platform may conserve resources that might otherwise be used to implement more costly techniques for identifying fraudulent or misrepresentative chat communications, such as sentiment analysis, manual analysis, and/or the like. Still further, the ML platform may improve accuracy of identifying fraudulent or misrepresentative chat communications or participants relative to a static rules-based approach. Thus, computing resources can be conserved by timely identifying the occurrence of fraud or misrepresentation and taking timely action.

Figure 1A:
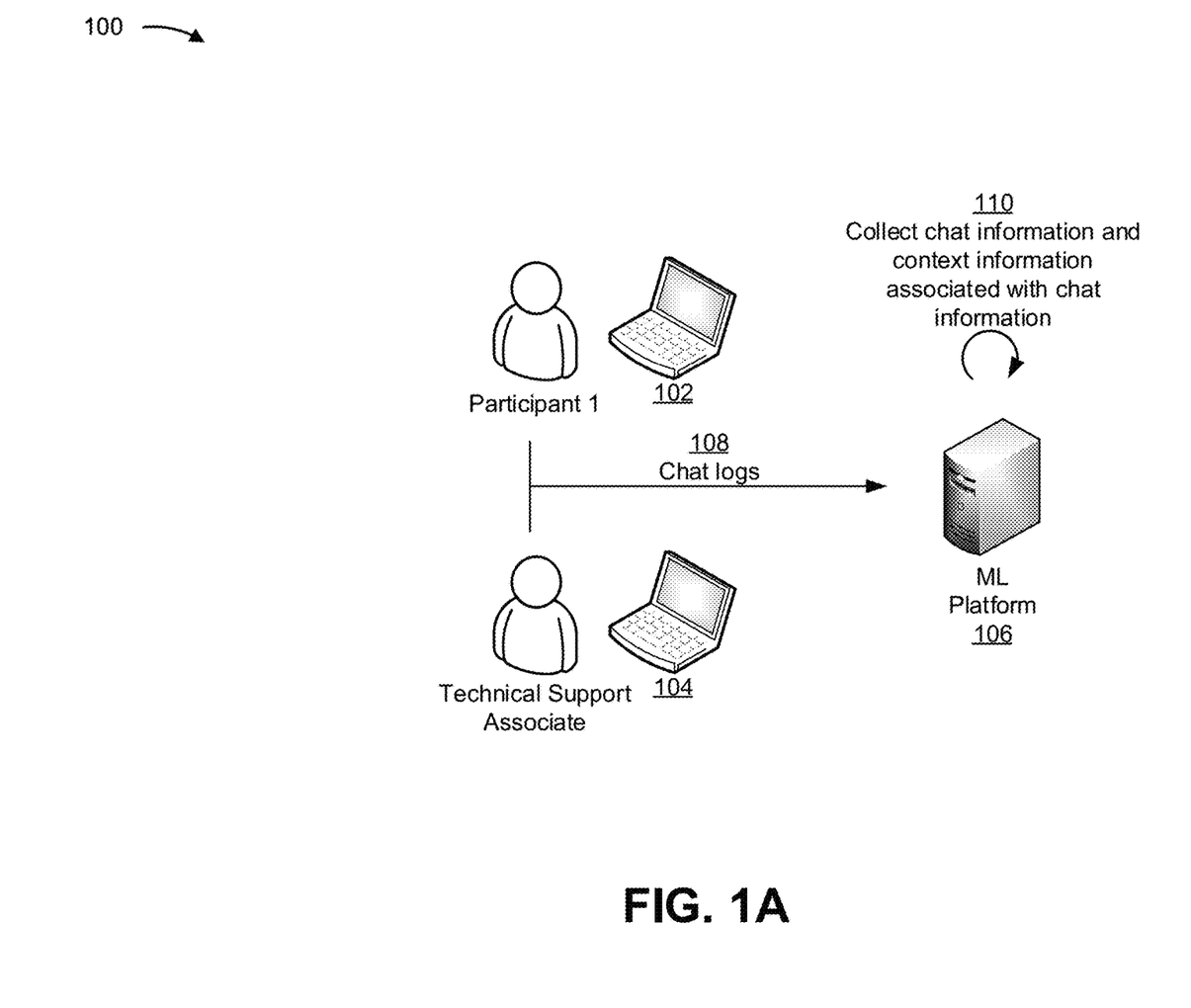
FIGS. 1A-1C are diagrams of one or more example implementations described herein.
Figure 1B:
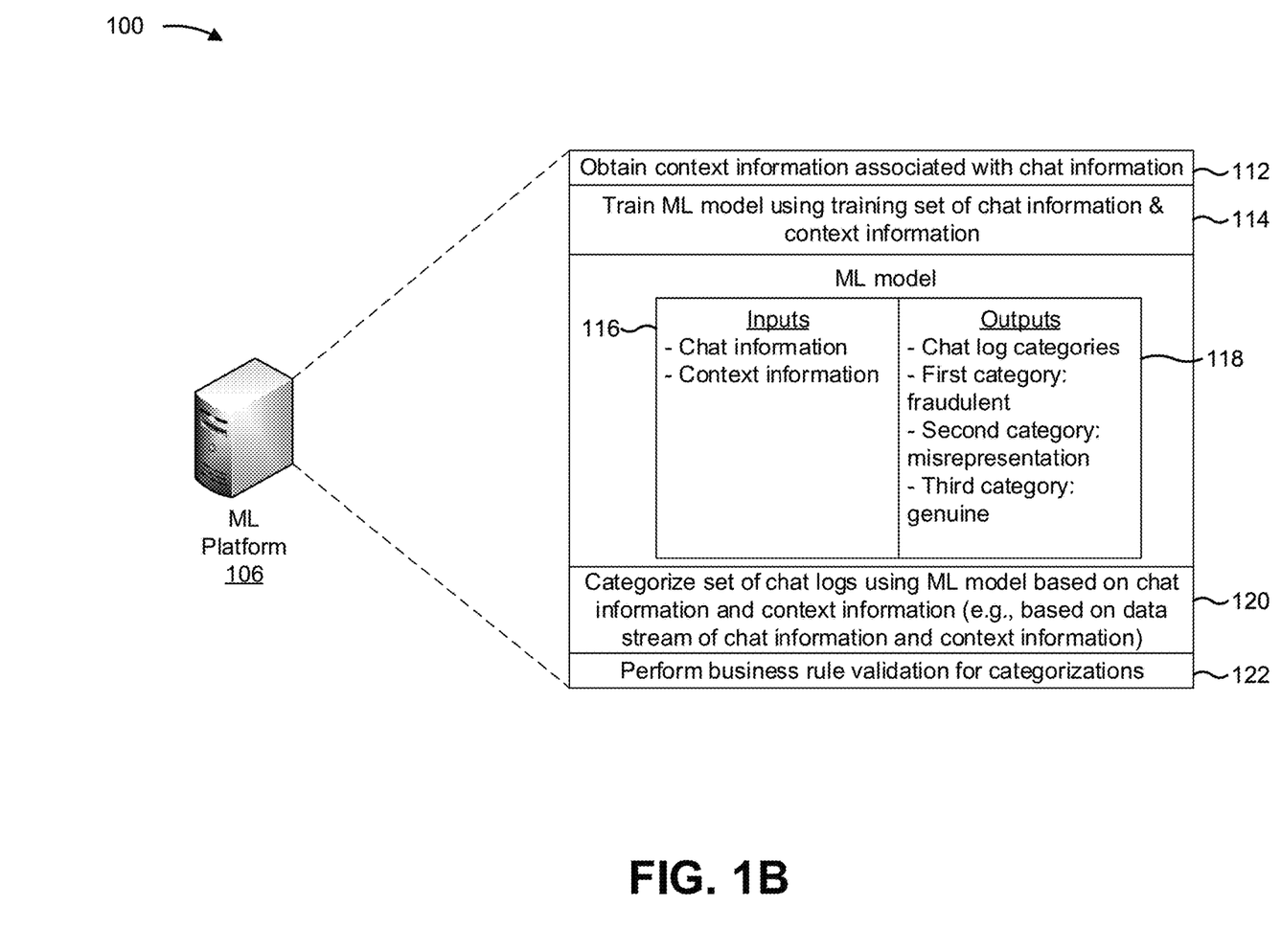
Figure 1C:
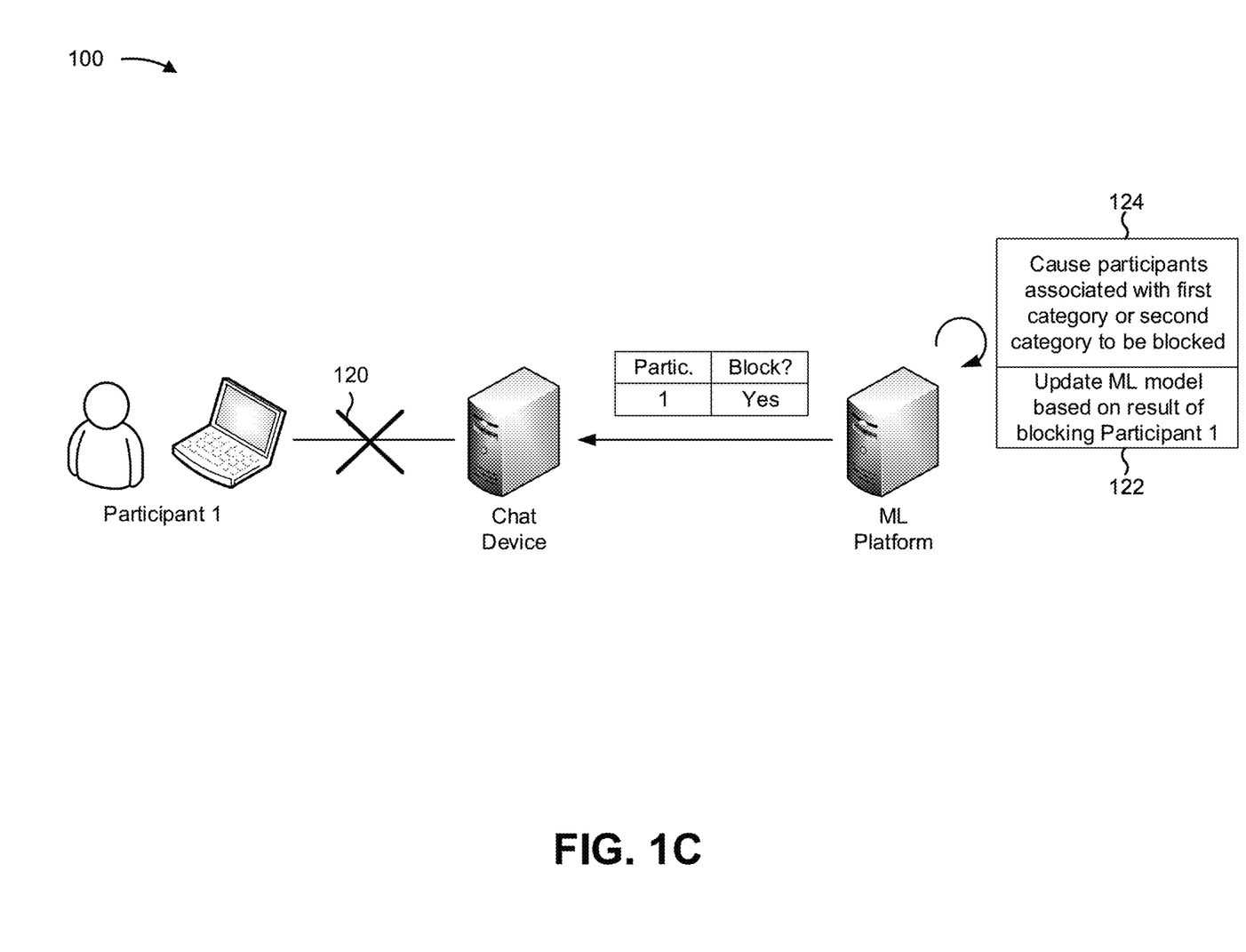

FIGS. 1A-1C are diagrams of one or more example implementations 100 described herein. As shown in FIG. 1A, a participant (shown in FIG. 1A as Participant 1 and using a device 102) may chat with an agent (shown in FIG. 1A as a Technical Support Associate and using a device 104), and chat logs regarding the chat communication may be provided to or stored by an ML platform 106, as shown by reference number 108. For example, the participant and the agent may chat via a chat interface provided by the ML platform and/or by a chat device (e.g., as shown in FIGS. 1C and 2). While a single participant and a single agent are shown in FIGS. 1A-1C, it should be understood that the implementations described herein can be applied for hundreds of participants and agents, thousands of participants and agents, and so on that are chatting concurrently or at different times. Furthermore, it should be understood that the implementations described herein can be applied for any number of chat logs, such as hundreds, thousands, millions or more chat logs.

As shown by reference number 110, the ML platform may collect (e.g., receive, obtain, store, etc.) chat information and context information associated with the chat information. The chat information may include information that identifies a chat log, the content of a chat log, values determined based on the chat log, and/or the like. For example, the chat information may include information identifying a chat count (e.g., a number of chat communications in a particular time frame for a participant), a chat duration, a chat length (e.g., a number of characters or words in a chat communication), a chat frequency (e.g., a number of chat communications per unit time), a type of the chat communication (e.g., customer service, technical support), a number of phrases (e.g., text strings) repeated in a single chat communication, a number of phrases repeated in multiple chat communications by a particular participant, a number of lines of a chat communication generated by a participant, a number of lines of a chat communication generated by an agent, a number of words used by a participant in a chat communication, a number of words used by an agent in a chat communication, a response of a participant to a request (e.g., a request for an account number or participant identifier, a request for an account name, a request for an account address, a request for an account phone number, and/or the like), a chat start date, and/or the like. The context information is described in more detail in connection with FIG. 1B.

As shown in FIG. 1B, and by reference number 112, the ML platform may obtain context information associated with the chat information. Context information may include information associated with a chat log or a participant corresponding to the chat log. For example, context information may identify a browser type of a participant, a network address of a participant, a survey rating provided by a participant in association with a chat log, a geographic location of a participant (e.g., country, state, region, etc.), whether a chat communication was performed in a location or store associated with the agent, a type of device used by the participant, a software version of a browser used by the participant, a software version of the chat application, a number of times that the participant has chatted with a particular agent or with any agent, the timing of prior chats with a particular agent or with any agent, timing of prior chats within a window (e.g., a chat frequency), and/or the like.

In some implementations, the ML platform may perform data aggregation and/or data preparation. For example, the ML platform may preprocess data (e.g., chat information, context information, and/or the like) to remove non-ASCII characters, white spaces, confidential data, and/or the like. In this way, the ML platform may organize thousands, millions, or billions of data entries for machine learning and model generation.

As shown by reference number 114, the ML platform may train an ML model using a training set based on the chat information and the context information. For example, the training set may identify chat information, context information, and categorizations corresponding to the chat information and context information. Implementations described herein are described in the context of three categories: a first category for fraudulent transactions, a second category for misrepresentative transactions, and a third category for transactions that are not identified as fraudulent or misrepresentative. In this case, the training set may be generated based on user interactions with a data visualization interface, as described in more detail in connection with FIG. 4. While FIGS. 1A-1C involve an example having three categories, it should be understood that the implementations described herein can be applied for any number or combination of categories.

In some implementations, the ML model may be based on an adaptive boosting algorithm, a gradient boosting algorithm, an extreme gradient boosting algorithm, a random forest algorithm, a neural network algorithm, or a combination thereof. Each is described below.

In some implementations, the ML model may be based on a boosting algorithm, such as a gradient boosting technique, an extreme gradient boosting technique, an adaptive boosting technique, and/or the like. Adaptive boosting is a machine learning algorithm that involves the combination of outputs of other learning algorithms, such as decision trees and/or the like, to determine a weighted sum that represents the final output of the boosted classifier. Gradient boosting, similarly to adaptive boosting, is a machine learning technique for regression and classification that produces a prediction model in the form of an ensemble of weak prediction models, such as decision trees. The predictions of the weak prediction models may be grouped based on a weighed combination. In a gradient boosting algorithm, each generation of predictor is fitted to the residual errors made by the previous predictor, whereas in an adaptive boosting algorithm, the weighted combinations are tweaked at each generation. Extreme gradient boosting may comprise various modifications to a gradient boosting algorithm, such as penalization of certain decision trees, proportional shrinking of leaf nodes, Newton boosting, an additional randomization parameter, and/or the like. Adaptive or gradient boosting may provide improved results relative to other ML models for unbalanced data sets, such as those involving fraudulent transaction identification.

In some implementations, the ML model may be based on a random forest algorithm. In a random forest algorithm, each decision tree is trained independently using a random sample of the training set. This randomness may make the model more robust than a single decision tree, and may be more robust against overfitting than a gradient boosting technique. Furthermore, the random forest algorithm may be well suited for multi-class problems, so therefore may provide computational and accuracy improvements when the chat information is to be grouped into three or more categories.

In some implementations, the ML model may be based on a neural network algorithm. A neural network, such as an artificial neural network, may be based on a collection of artificial neurons. Each edge between neurons can transmit a signal from one artificial neuron to another. An artificial neuron that receives a signal can process the signal and then signal other neurons. Each neuron may be associated with a function that applies a function to inputs of the neuron to generate the output. For example, neurons and edges may have weights that are adjusted as the machine learning process proceeds. The neural network may improve classification performance relative to other techniques when the data set to be classified is very large.

In some implementations, the ML platform may use another classification technique, such as a logistic regression classification technique, and/or the like, to determine a categorical outcome (e.g., a category for a chat, and/or the like). Additionally, or alternatively, the ML platform may use a naïve Bayesian classifier technique. In this case, the ML platform may perform binary recursive partitioning to split the data of the minimum feature set into partitions and/or branches and use the partitions and/or branches to perform predictions (e.g., predicted categories for chats).

Based on using recursive partitioning, the ML platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the ML platform may use a support vector machine (SVM) classifier technique to generate a non-linear boundary between data points in the training set. In this case, the non-linear boundary is used to classify test data (e.g., chat information and/or context information) into a particular class (e.g., a particular category, two or more categories, and/or the like).

Additionally, or alternatively, the ML platform may train the ML model using a supervised training procedure that includes receiving input to the model from a subject matter expert, which may reduce an amount of time, an amount of processing resources, and/or the like to train the ML model relative to an unsupervised training procedure. In some implementations, the ML platform may use one or more other model training techniques, such as a latent semantic indexing technique, and/or the like. For example, the ML platform may perform an artificial neural network processing technique (e.g., using a two-layer feedforward neural network architecture, a three-layer feedforward neural network architecture, and/or the like) to perform pattern recognition for classification of chat information and/or context information. In this case, using the artificial neural network processing technique may improve an accuracy of a model (e.g., the ML model) generated by the ML platform by being more robust to noisy, imprecise, or incomplete data, and by enabling the ML platform to detect patterns and/or trends undetectable to human analysts or systems using less complex techniques.

Accordingly, the ML platform may use any number of artificial intelligence techniques, machine learning techniques, deep learning techniques, and/or the like to classify the chat information and/or context information.

In some implementations, the ML platform may train and/or update the ML model locally (e.g., using resources of the ML platform). Training and/or updating the ML model locally may reduce network resource usage associated with communicating in connection with the ML model and may permit the ML model to be updated locally. In some implementations, the ML platform may receive the ML model from another device, or may provide chat information and context information to the other device for processing to determine corresponding categories, which may conserve processing resources of the ML platform that would otherwise be used to locally train the ML model.

Examples of inputs of the ML model are shown by reference number 116. As shown, the ML model may receive, as input, chat information and context information associated with a set of chat communications. For example, this chat information and context information may be associated with a set of chat communications to which categories are to be assigned. Examples of outputs of the ML model are shown by reference number 118. As shown, the outputs may indicate whether a particular chat communication, a particular participant, or a set of chat logs (e.g., a set of chat logs associated with a group of participants, a set of chat logs associated with a particular agent, a set of chat logs associated with a particular location, and/or the like) are classified as fraudulent, misrepresentative, or genuine. Thus, the ML platform may efficiently and scalably identify categories based on a machine learning algorithm, which provides the ability to dynamically update the ML model as new chat communications are received. In this way, accuracy and relevance of the ML model may be maintained in the face of changing techniques of participants.

As shown by reference number 114, the ML platform may categorize a set of chat logs using the ML model. For example, the ML model may output an indication of categories for the set of chat logs based on the chat information and the context information for the set of chat logs. In some implementations, a participant may be assigned a category. For example, an identifier or network address associated with the participant may be associated with the first category, the second category, or the third category based on an output of the ML model. In some implementations, a set of one or more chat communications may be assigned a category. For example, the ML model may output information indicating that the set of one or more chat communications is associated with a particular category. In this case, the ML platform may assign a category to the set of chat communications, to a participant associated with the set of chat communications, and/or the like.

In some implementations, the ML platform may categorize a set of chat communications or a participant based on a threshold. For example, the ML model may output information indicating one or more possible categories for a set of chat communications and respective confidence levels associated with the one or more possible categories. The ML platform may assign, to the set of chat communications or the participant, a category associated with a highest confidence level, a category associated with a highest confidence level that satisfies a threshold, and/or the like. In the case that no confidence level satisfies the threshold, the ML platform may determine not to block the chat communication, may provide the chat communication for manual processing (e.g., via a dashboard, as described in more detail in connection with FIG. 4, below), and/or the like. Thus, the ML platform may reduce the occurrence of overly aggressive categorization, thereby reducing unnecessary blocking and improving accuracy of the ML model.

In some implementations, the ML platform may perform real-time categorization of chats. For example, the ML platform may receive or obtain chat information and context information as a chat is performed, may input the chat information and context information to the ML model, may determine a category for the chat based on an output of the ML model, and may accordingly block or offer the chat based on the category. Real-time categorization of chats may reduce latency associated with categorizing chats and may enable the blocking of chats as the chats occur, rather than after the fact. In some implementations, the ML platform may perform post hoc categorization of chats. For example, the ML platform may receive chat information and context information associated with a set of chats that have already occurred, may determine categories for the set of chats, and may selectively cause participants associated with the set of chats to be blocked in the future based on the categories. Post hoc categorization of chats may conserve computing resources of the ML platform relative to real-time categorization of chats.

As shown by reference number 116, in some implementations, the ML platform may perform or facilitate business rule validation of the categories assigned to chat communications. For example, business rule validation may refer to determining whether a value (e.g., a category assigned to a chat log) is acceptable based on a policy or procedure. As possible examples, some business rules may include approving or denying a categorization based on a login status of a participant, approving or denying a categorization based on whether a participant is associated with an internal network, approving or denying a categorization based on a probability threshold associated with a categorization, and/or the like.

As shown in FIG. 1C, and by reference number 118, the ML platform may cause participants, associated with the first category (e.g., fraudulent participants) or the second category (e.g., misrepresentative participants) to be blocked from future chat communications. For example, the ML platform may provide, to a chat device, information identifying participants that are to be blocked. In some implementations, the information identifying participants that are to be blocked may include any information identifying a participant, such as a network address (e.g., a media access control (MAC) address, an Internet protocol (IP) address, and/or the like), a hardware profile, an account name, an account number, and/or the like.

As shown by reference number 120, the participant may be blocked from a chat interface provided by a chat device (e.g., which may or may not be part of the ML platform). For example, the chat device may determine that the participant desires to initiate a chat communication, may refer to a data structure to determine whether the participant is blocked, and may block the chat communication based on determining that the participant is blocked. Thus, the chat device may prevent malicious entities from utilizing the chat interface. This may conserve resources of the chat device and/or the ML platform, reduce the occurrence of fraud, and improve the accuracy of performance feedback for agents. In some implementations, the chat device or the ML platform may store or provide information indicating that the participant attempted to perform a chat communication, which may be useful for updating the model, reporting purposes, and/or the like, as described in more detail in connection with FIG. 4.

As shown by reference number 122, the ML platform may update the ML model. For example, as the ML platform categorizes various chat communications, the ML platform may update a training set of the ML model, and may update parameters of the ML model based on the training set and using a machine learning algorithm. Thus, accuracy of the ML model may be improved over time. Furthermore, it may be expected that techniques used by malicious participants may evolve over time. By updating the ML model over time, robustness of the ML model against changing techniques may be improved. Over time, this may conserve processor and/or network resources of the chat device and/or the ML platform that would otherwise be used to interact with malicious participants.

As indicated above, FIGS. 1A-1C are provided as one or more examples. Other examples are possible and may differ from what is described in connection with FIGS. 1A-1C. The number and arrangement of devices and networks shown in FIGS. 1A-1C are provided as one or more examples. In practice, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementation(s) 100 may perform one or more functions described as being performed by another set of devices of example implementation 100.

Figure 2:
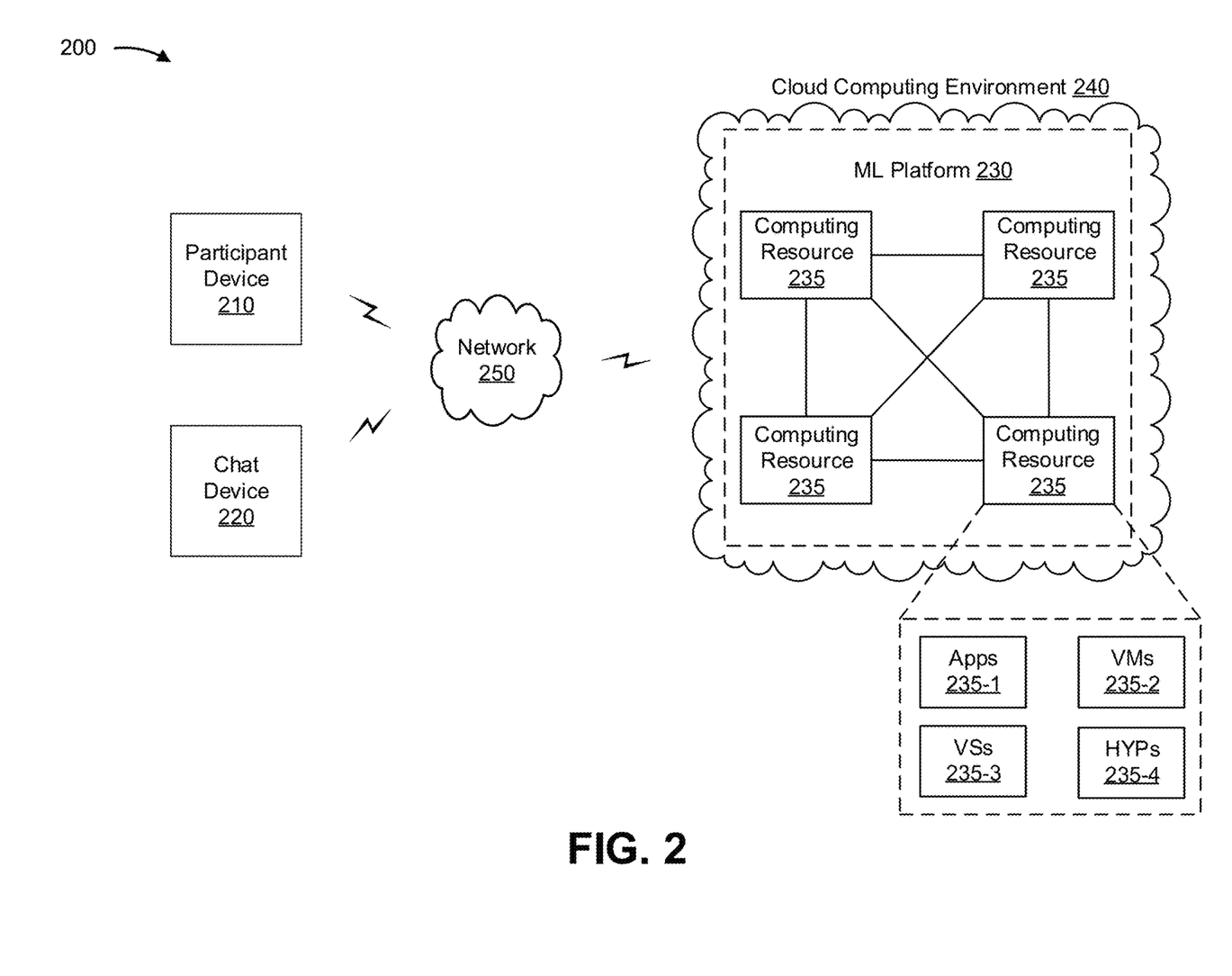
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a participant device 210, a chat device 220, an ML platform 230, computing resources 235, a cloud computing environment 240, and a network 250. Devices of environment 200 may interconnect via wired connections, wireless connections, or a combination of wired and wireless connections.

Participant device 210 includes one or more devices capable of receiving, generating, storing, processing, and/or providing information associated with a chat communication. For example, participant device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Chat device 220 includes one or more devices capable of storing, processing, and/or routing information associated with a chat interface. In some implementations, chat device 220 may be included in or coextensive with ML platform 230. In some implementations, chat device 220 may include a communication interface that allows chat device 220 to receive information from and/or transmit information to other devices in environment 200.

ML platform 230 includes one or more computing resources assigned to training and applying an ML model. For example, ML platform 230 may be a platform implemented by cloud computing environment 240 that may train and apply an ML model to categorize chat communications as fraudulent, misrepresentative, or acceptable. In some implementations, ML platform 230 is implemented by computing resources 235 of cloud computing environment 240.

ML platform 230 may include a server device or a group of server devices. In some implementations, ML platform 230 may be hosted in cloud computing environment 240. Notably, while implementations described herein describe ML platform 230 as being hosted in cloud computing environment 240, in some implementations, ML 230 may be non-cloud-based or may be partially cloud-based.

Cloud computing environment 240 includes an environment that delivers computing as a service, whereby shared resources, services, etc. may be provided to ML platform 230, chat device 220, and/or the like. Cloud computing environment 240 may provide computation, software, data access, storage, and/or other services that do not require end-user knowledge of a physical location and configuration of a system and/or a device that delivers the services. As shown, cloud computing environment 240 may include computing resources 235.

Computing resource 235 includes one or more personal computers, workstation computers, server devices, or another type of computation and/or communication device. In some implementations, computing resource 235 may host ML platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device E05. Application 235-1 may eliminate a need to install and execute the software applications on user device E05. For example, application 235-1 may include software associated with ML platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., user device E05), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
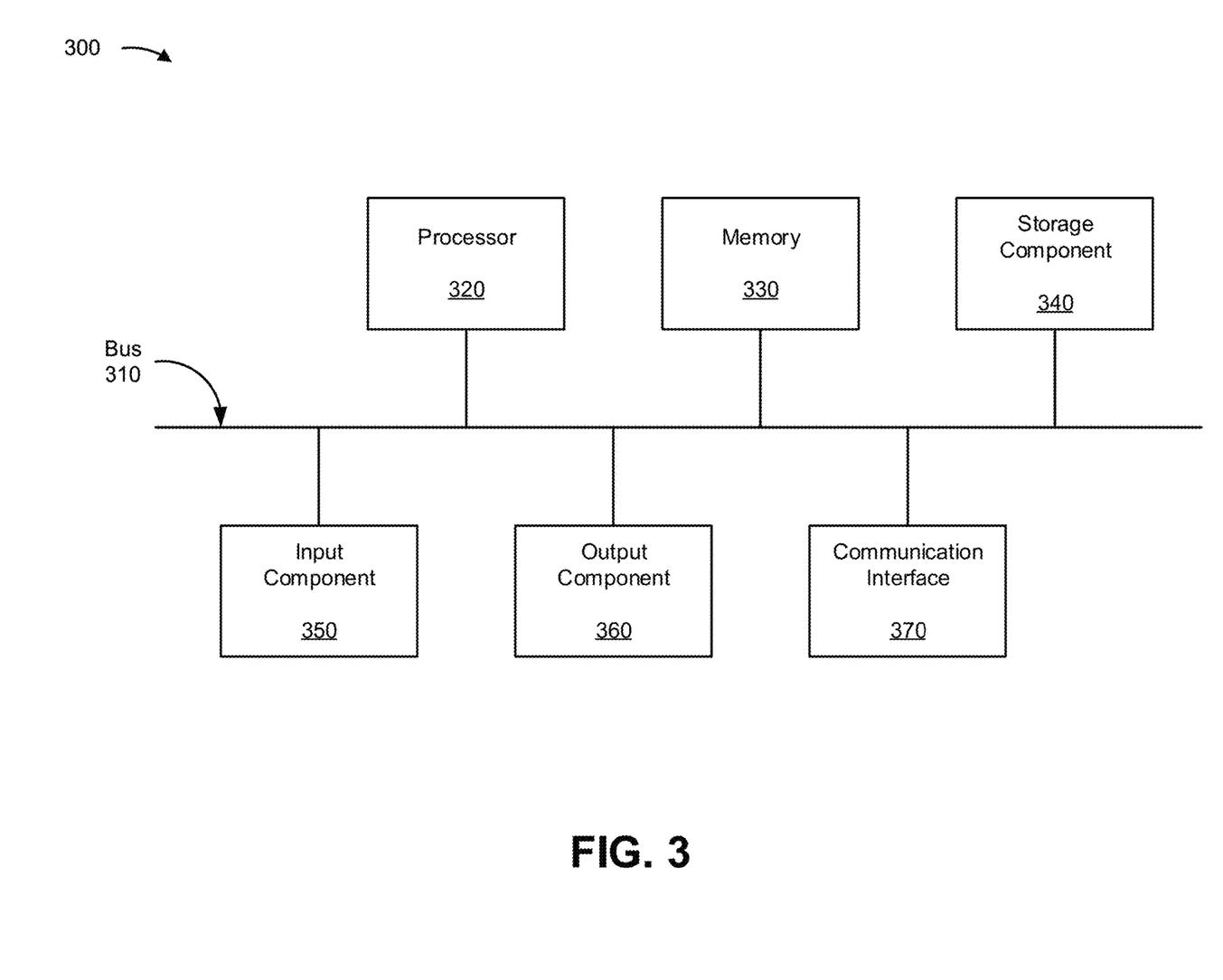
FIG. 3 is a diagram of example components of one or more devices of FIG. 2.

FIG. 3 is a diagram of example components of a device 300. Device 300 may correspond to participant device 210, chat device 220, or computing resource 235. In some implementations, participant device 210, chat device 220, or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes one or more memories, such as a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
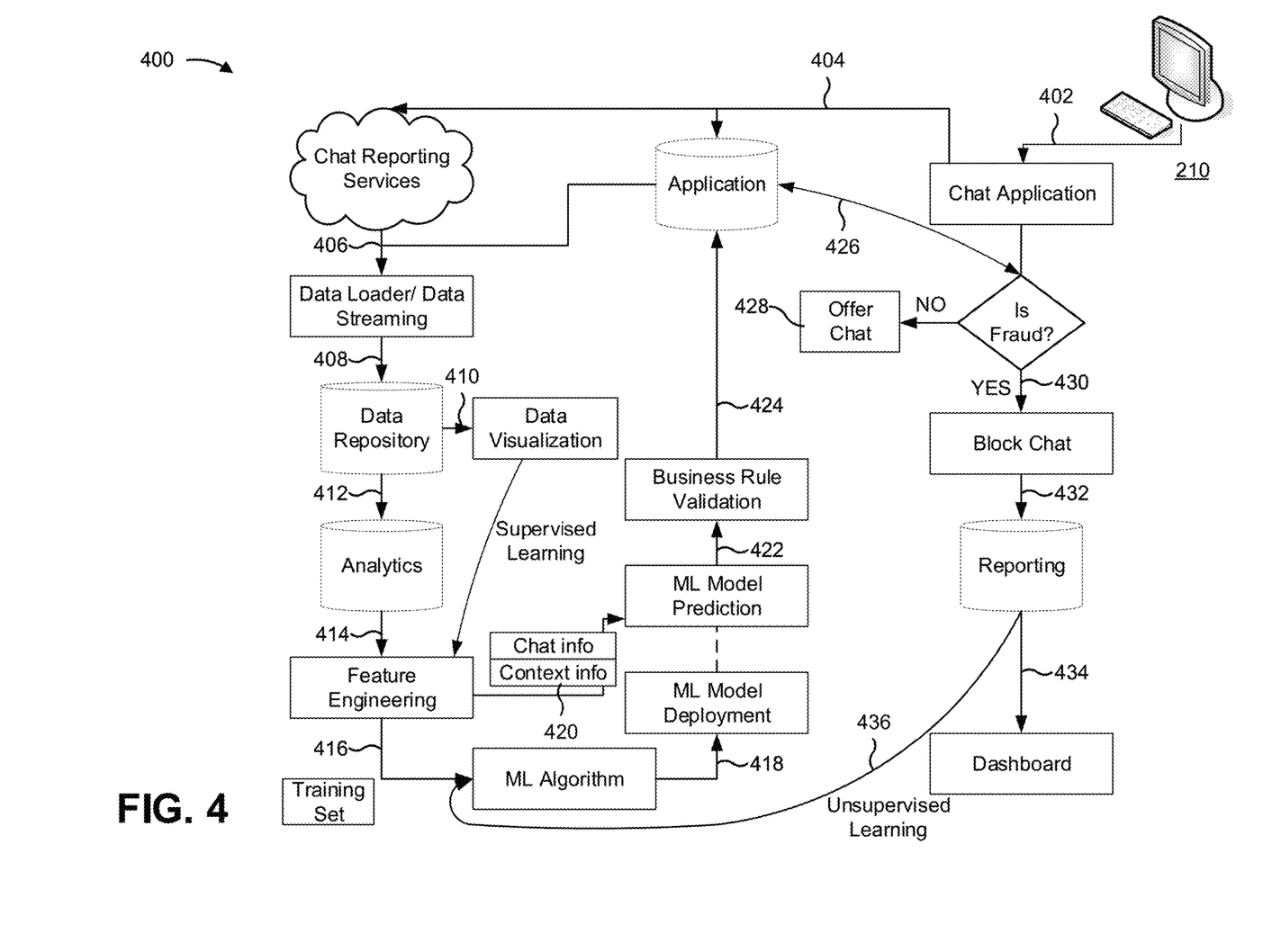
FIG. 4 is a diagram of an example implementation of a machine learning (ML) platform described herein.

FIG. 4 is a diagram of an example architecture 400 of ML platform 230 described herein. As indicated by reference number 402, a chat application (e.g., provided by ML platform 230, chat device 220, and/or the like) may provide a chat interface, via which a participant may chat using participant device 210. As shown by reference number 404, the chat application may collect chat information (e.g., chat logs, chat length, chat frequency, and/or the like, as described in more detail elsewhere herein) and context information associated with the chat information (e.g., browser information, geolocation information, and/or the like, as described in more detail elsewhere herein). As further shown, the chat application may provide the chat information and/or the context information to an application data structure and/or to a chat reporting service. The application data structure may store the chat information and/or the context information. The chat reporting service may provide reporting and/or communication of chat information and/or context information. For example, as indicated by reference number 406, the chat reporting service and/or the application data structure may provide chat information and/or context information to a data loader or data streaming application. The data loader or data streaming application may stream chat information and/or context information to a data repository, shown by reference number 408.

In some implementations, the data repository may provide chat information and/or context information for visualization by a data visualization application, as shown by reference number 410. For example, the data visualization application may provide visualizations of chat information and/or context information. In some implementations, the data visualization application may provide for supervised training of the ML model. For example, a user may specify categories for particular chat information and/or context information, which may be used to determine a training set for the ML model. In some implementations, the data repository may be a Structured Query Language (SQL) data repository, a NoSQL data repository, or a different type of data structure.

As shown by reference number 412, an analytics data structure may receive chat information and/or context information from the data repository. For example, the analytics data structure may receive this information based on queries for information, such as for n-grams of a chat log, survey scores identified by context information, geolocation information, and/or the like. This information may be used to select features for the ML model and/or to train the ML model. For example, this information may be used for a training set for the ML model.

As shown by reference number 414, a feature engineering application may receive data from the analytics data structure. For example, the feature engineering application may perform exploratory data analysis on the chat information and/or context information, and may generate a training set of chat information, context information, and corresponding categories for training the ML model. In some implementations, the feature engineering application may generate the training set based on information received from the data visualization application. For example, the data visualization application may provide information identifying categories for particular sets of chat information and context information based on user interactions with a data visualization provided by the data visualization application. Thus, ML platform 230 may obtain user input regarding categorizations for particular chat logs or participants, thereby enabling supervised learning for the ML model.

As shown by reference number 416, the feature engineering application may provide a training set to a ML algorithm. The ML algorithm may generate an ML model based on the training set, as described in more detail elsewhere herein. As shown by reference number 418, ML platform 230 may deploy the ML model. For example, ML platform 230 may configure the ML model to be used to categorize a set of chat logs, as described below.

As shown by reference number 420, the ML platform 230 may use the ML model to predict (e.g., determine) categories for a set of chat logs that are associated with chat information and context information. For example, and as shown, the feature engineering application may provide information associated with the set of chat logs as an input to the ML model. The ML model may predict one or more categories for the set of chat logs (not shown).

As shown by reference number 422, ML platform 230 may perform or facilitate business rule validation for the set of chat logs and/or the categorizations of the set of chat logs. Business rule validation is described in more detail in connection with FIGS. 1A-1C, above.

As shown by reference number 424, ML platform 230 may store, in the application data structure, information identifying chats (e.g., and/or participants) that are to be blocked based on the categorizations. For example, ML platform 230 may store information indicating participants that are associated with a fraudulent category or a misrepresentative category are to be blocked. Thus, ML platform 230 may configure chat communications to be blocked based on identifying the chat communications as fraudulent or misrepresentative, thereby conserving resources of ML platform 230 used to host such chat communications and/or organizational resources that would otherwise be used to deploy an agent for such chat communications.

As shown by reference number 426, ML platform 230 may determine whether a chat (e.g., an ongoing chat with participant device 210, a new chat, and/or the like) is fraudulent or misrepresentational (e.g., whether an identifier or network address associated with the chat is identified by the application data structure as associated with a fraudulent or misrepresentational category). As shown by reference number 428, when the chat is not identified as fraudulent or misrepresentational, then ML platform 230 (e.g., the chat application) may offer (e.g., host, provide, facilitate, etc.) a chat for a participant of the chat. As shown by reference number 430, when the chat is identified as fraudulent or misrepresentational, then ML platform 230 may cause the chat to be blocked. For example, ML platform 230 or chat device 220 may block a network address associated with the chat, may block an identifier associated with the participant, and/or the like. As shown by reference number 432, when the chat is identified as fraudulent or misrepresentational, ML platform 230 may store, in a reporting data structure, information indicating that an attempt was made to interact with the chat application. This may enable report, tracking, and tuning of the ML model to improve accuracy.

As shown by reference number 434, ML platform 230 may provide a dashboard. The dashboard may enable the monitoring of information associated with machine learning-based chat analysis, such as chat communications that are blocked, information regarding system utilization, information regarding the training of the ML model, and/or the like.

As shown by reference number 436, ML platform 230 may update or train the ML model based on results of categorizing the chat communications. For example, ML platform 230 may add information stored by the reporting data structure to the training set, and may perform an ML technique based on the training set. In this case, ML platform 230 may perform an unsupervised ML technique, although ML platform 230 may additionally or alternatively perform a supervised ML technique. In this way, ML platform 230 may iteratively update the ML model, thereby improving accuracy and adapting the ML model to changing approaches of fraudulent or misrepresentational participants.

As indicated above, FIG. 4 is provided as an example. Other examples may differ from what is described in connection with FIG. 4.

Figure 5:
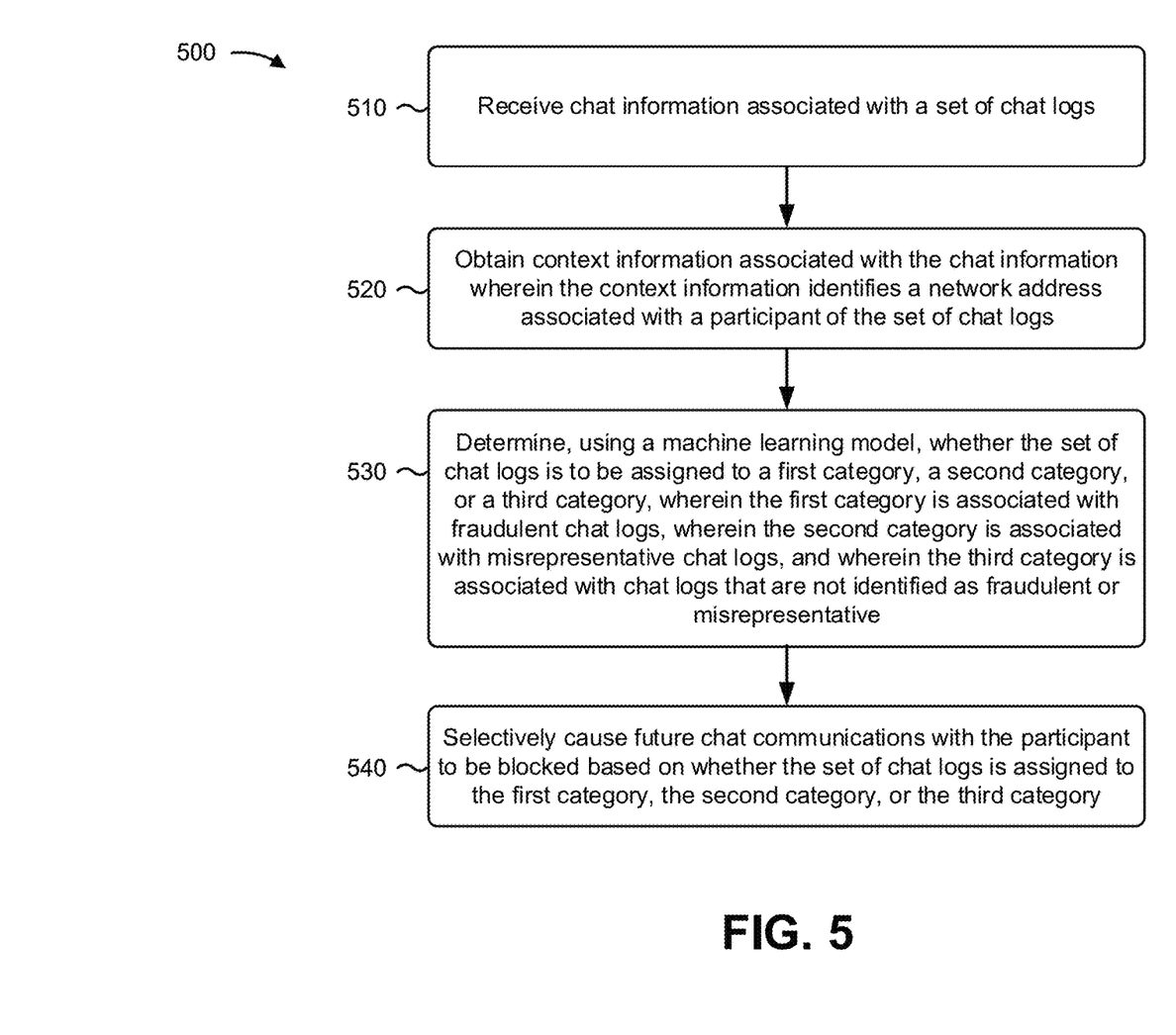
FIG. 5 is a flow chart of an example process for machine learning based chat analysis.

FIG. 5 is a flow chart of an example process 500 for machine learning based chat analysis. In some implementations, one or more process blocks of FIG. 5 may be performed by a device, such as an ML platform (e.g., ML platform 230 and/or the like). In some implementations, one or more process blocks of FIG. 5 may be performed by another device or a group of devices separate from or including the ML platform, such as a participant device (e.g., participant device 210), a chat device (e.g., chat device 220), and/or the like.

As shown in FIG. 5, process 500 may include receiving chat information associated with a set of chat logs (block 510). For example, the ML platform (e.g., using computing resource 235, processor 320, memory 330, input component 350, communication interface 370, and/or the like) may receive chat information associated with a set of chat logs, as described above. In some implementations, the ML platform may receive a data stream identifying the chat information, which may reduce storage requirements for the chat information and which may enable real-time chat processing. In some implementations, the ML platform may receive the chat information in a batch format, which may conserve resources of the ML platform that would otherwise be used to process the chat information on the fly.

As further shown in FIG. 5, process 500 may include obtaining context information associated with the chat information wherein the context information identifies a network address associated with a participant of the set of chat logs (block 520). For example, the ML platform (e.g., using computing resource 235, processor 320, memory 330, storage component 340, input component 350, output component 360, communication interface 370, and/or the like) may obtain context information associated with the chat information, as described above. In some implementations, the context information identifies at least a network address associated with a participant of the set of chat logs. In some implementations, the context information includes metadata associated with the set of chat logs, survey information associated with the set of chat logs, and/or other information as described in more detail elsewhere herein.

As further shown in FIG. 5, process 500 may include determining, using a machine learning model, whether the set of chat logs is to be assigned to a first category, a second category, or a third category, wherein the first category is associated with fraudulent chat logs, wherein the second category is associated with misrepresentative chat logs, and wherein the third category is associated with chat logs that are not identified as fraudulent or misrepresentative (block 530). For example, the ML platform (e.g., using computing resource 235, processor 320 and/or the like) may determine, using a machine learning model, whether the set of chat logs is to be assigned to a first category, a second category, or a third category. In some implementations, the first category is associated with fraudulent chat logs. In some implementations, the second category is associated with chat logs involving a misrepresentation. In some implementations, the third category is associated with chat logs that are not identified as fraudulent or involving a misrepresentation.

In some implementations, the ML model may categorize a chat log based on a natural language processing (NLP) technique. For example, the NLP technique may provide an indication of semantic similarity across multiple chat logs, may provide a sentiment analysis for one or more chat logs, may determine a likelihood that multiple chat logs are associated with a same participant, and/or the like. In such a case, the ML model may receive, as input, features determined using the NLP technique, and may categorize a corresponding chat log based on the features. In particular, using NLP may enable the detection and blocking of a malicious participant even when the participant has changed network address, account credentials, and/or the like. Thus, NLP may conserve resources of the chat device and/or the ML platform that would otherwise be used to provide a chat for a malicious participant.

In some implementations, the ML model may assign a category based on whether a phrase is repeated within a chat log, of the set of chat logs, or in two or more chat logs of the set of chat logs. For example, the ML model may assign a fraudulent or misrepresentational category to a participant when a particular phrase is repeated in multiple, different chat logs, since this may indicate that the participant is attempting to acquire a particular device fraudulently or attempting to interact with many different agents in a short period of time. In some implementations, the ML platform may determine that a particular phrase is substantially repeated, for example, using NLP. Thus, an exact match may not be necessary between chat logs.

In some implementations, the ML platform may train the machine learning model using a machine learning technique based on a training set of chat logs and corresponding categories. For example, the machine learning technique may be based on a gradient boosting technique or an extreme gradient boosting technique, a random forest technique, a neural network technique, an adaptive boost technique, and/or the like. The training of the ML model is described in more detail elsewhere herein.

As further shown in FIG. 5, process 500 may include selectively causing future chat communications with the participant to be blocked based on whether the set of chat logs is assigned to the first category, the second category, or the third category (block 540). For example, the ML platform (e.g., using computing resource 235, processor 320, memory 330, storage component 340, input component 350, output component 360, communication interface 370 and/or the like) may cause future chat communications with the participant to be blocked based on whether the set of chat logs is assigned to the first category, the second category, or the third category, as described above. In some implementations, the ML platform may store and/or provide information indicating that the participant is to be blocked. In some implementations, the ML platform may cause the future chat communications to be blocked when the participant (or the set of chat logs) is associated with the first category or the second category. In some implementations, the ML platform may update the ML model as chat communications are performed or blocked, as described in more detail elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, information associated with a set of chat logs;
obtaining, by the device, context information associated with the information,
wherein the context information identifies a network address associated with a participant of the set of chat logs;
determining, by the device and using a natural language processing (NLP) technique, a likelihood that the set of chat logs is associated with a same participant,
wherein the NLP technique provides at least one of:
an indication of semantic similarity across the set of chat logs, or
a sentiment analysis across the set of chat logs;
analyzing, by the device, based on the likelihood that the set of chat logs is associated with the same participant, and using a machine learning model, whether the set of chat logs is to be assigned to a first category, a second category, or a third category,
wherein the first category is associated with fraudulent chat logs,
wherein the second category is associated with misrepresentative chat logs,
wherein the third category is associated with chat logs that are not identified as fraudulent or misrepresentative,
wherein the machine learning model is trained based on a training set of chat logs and corresponding categories, and
wherein the machine learning model receives as input, features determined using the NLP technique; and
selectively causing, by the device, future chat communications associated with the network address or associated with the same participant to be blocked based on whether the set of chat logs is assigned to the first category, the second category, or the third category.

2. The method of claim 1, wherein the machine learning model is based on a gradient boosting technique or an extreme gradient boosting technique.

3. The method of claim 1, wherein the machine learning model is based on at least one of:
   a random forest technique,
   a neural network technique, or
   an adaptive boost technique.

4. The method of claim 1, wherein analyzing whether the set of chat logs is to be assigned to the first category, the second category, or the third category comprises:
   determining whether the set of chat logs is to be assigned to the first category, the second category, or the third category based on at least one of a chat count, a chat length, a chat duration, or a chat frequency identified by the information.

5. The method of claim 1, wherein analyzing whether the set of chat logs is to be assigned to the first category, the second category, or the third category comprises:
   determining whether the set of chat logs is to be assigned to the first category, the second category, or the third category based on a browser type associated with the set of chat logs.

6. The method of claim 1, further comprising:
   performing the NLP technique to determine content of the set of chat logs,
      wherein analyzing whether the set of chat logs is to be assigned to the first category, the second category, or the third category is based on the content of the set of chat logs.

7. The method of claim 1, wherein analyzing whether the set of chat logs is to be assigned to the first category, the second category, or the third category comprises:
   determining whether the set of chat logs is to be assigned to the first category, the second category, or the third category based on whether a phrase is repeated within one or more chat logs of the set of chat logs.

8. A device, comprising:
   one or more processors configured to:
      receive information that identifies a set of chat logs;
      determine context information associated with the information,
         wherein the context information includes at least one of:
            a network address associated with the set of chat logs,
            metadata associated with the set of chat logs, or
            survey information associated with the set of chat logs;
      determine, using a natural language processing (NLP) technique, a likelihood that the set of chat logs is associated with a same participant,
         wherein the NLP technique provides at least one of:
            an indication of semantic similarity across the set of chat logs, or a sentiment analysis across the set of chat logs;
      analyze, based on the likelihood that the set of chat logs is associated with the same participant and using a machine learning model, whether the set of chat logs is to be assigned to a first category, a second category, or a third category,
         wherein the first category is associated with fraudulent chat logs,
         wherein the second category is associated with misrepresentative chat logs,
         wherein the third category is associated with chat logs that are not identified as fraudulent or misrepresentative,
         wherein the machine learning model is trained based on a training set of chat logs and corresponding categories, and
         wherein the machine learning model receives as input, features determined using the NLP technique; and
      cause future chat communications associated with the network address or an identifier associated with the same participant to be blocked when the set of chat logs is assigned to the first category or the second category.

9. The device of claim 8, wherein the machine learning model is based on a gradient boosting technique or an extreme gradient boosting technique.

10. The device of claim 8, wherein the machine learning model is based on at least one of:
    a random forest technique,
    a neural network technique, or
    an adaptive boost technique.

11. The device of claim 8, wherein the one or more processors, when analyzing whether the set of chat logs is to be assigned to the first category, the second category, or the third category, are configured to:
    determine whether the set of chat logs is to be assigned to the first category, the second category, or the third category based on a chat count, a chat length, a chat duration, or a chat frequency of the set of chat logs.

12. The device of claim 8, wherein the metadata identifies a browser type associated with the set of chat logs.

13. The device of claim 8, wherein the one or more processors, when analyzing whether the set of chat logs is to be assigned to the first category, the second category, or the third category, are configured to:
    determine whether the set of chat logs is to be assigned to the first category, the second category, or the third category based on whether a text string is repeated within one or more chat logs of the set of chat logs.

14. A non-transitory computer-readable medium storing instructions, the instructions comprising:
    one or more instructions that, when executed by one or more processors, cause the one or more processors to:
       receive a training set of chat logs and corresponding categories for the chat logs,
          wherein the corresponding categories are selected from:
             a first category associated with fraudulent chat logs,
             a second category associated with misrepresentative chat logs, or
             a third category associated with chat logs that are not identified as fraudulent or misrepresentative;
       train a machine learning model using a machine learning technique based on the training set of chat logs and the corresponding categories for the training set of chat logs;
       receive information that identifies a set of chat logs;
       obtain context information associated with the information,
          wherein the context information includes a network address associated with a participant of the set of chat logs;

determine, using the machine learning model and a natural language processing (NLP) technique, a likelihood that the set of chat logs is associated with a same participant,
 wherein the NLP technique provides at least one of:
  an indication of semantic similarity across the set of chat logs, or
  a sentiment analysis across the set of chat logs;
 determine, using the machine learning model and based on the likelihood that the set of chat logs is associated with the same participant, whether the set of chat logs is to be assigned to the first category, the second category, or the third category,
  wherein the machine learning model receives as input, features determined using the NLP technique; and
 cause future chat communications associated with the network address or an identifier associated with the same participant to be blocked from a chat interface when the set of chat logs is assigned to the first category or the second category.

15. The non-transitory computer-readable medium of claim 14, wherein the machine learning technique is based on a gradient boosting technique or an extreme gradient boosting technique.

16. The non-transitory computer-readable medium of claim 14, wherein the machine learning technique is based on at least one of:
 a random forest technique,
 a neural network technique, or
 an adaptive boost technique.

17. The non-transitory computer-readable medium of claim 14, wherein the one or more instructions, that cause the one or more processors to determine, using the machine learning model, whether the set of chat logs is to be assigned to the first category, the second category, or the third category, cause the one or more processors to:
 determine whether the set of chat logs is to be assigned to the first category, the second category, or the third category based on at least one of a chat count, a chat length, a chat duration, or a chat frequency identified by the information.

18. The non-transitory computer-readable medium of claim 14, wherein the one or more instructions, when executed by the one or more processors, further cause the one or more processors to:
 perform the NLP technique to determine content of the set of chat logs,
  wherein determining whether the set of chat logs is to be assigned to the first category, the second category, or the third category is based on the content of the set of chat logs.

19. The method of claim 1, further comprising:
 providing an application for supervised training of the machine learning model and display information associated with at least one of the set of chat logs or the context information.

20. The device of claim 8, wherein the one or more processors are further configured to:
 provide an application for supervised training of the machine learning model and display information associated with at least one of the set of chat logs or the context information.

* * * * *